United States Patent
Quesnel

(10) Patent No.: US 9,800,039 B2
(45) Date of Patent: Oct. 24, 2017

(54) ASYMMETRICAL STOCKBRIDGE DAMPER

(71) Applicant: AFL TELECOMMUNICATIONS LLC, Duncan, SC (US)

(72) Inventor: Wayne Quesnel, Moore, SC (US)

(73) Assignee: AFL Telecommunications LLC, Duncan, SC (US)

(*) Notice: Subject to any disclaimer, the term of this patent is extended or adjusted under 35 U.S.C. 154(b) by 31 days.

(21) Appl. No.: 14/786,620

(22) PCT Filed: Jul. 23, 2014

(86) PCT No.: PCT/US2014/047816
§ 371 (c)(1),
(2) Date: Oct. 23, 2015

(87) PCT Pub. No.: WO2015/013406
PCT Pub. Date: Jan. 29, 2015

(65) Prior Publication Data
US 2016/0079745 A1    Mar. 17, 2016

Related U.S. Application Data

(60) Provisional application No. 61/857,811, filed on Jul. 24, 2013.

(51) Int. Cl.
*H02G 7/14* (2006.01)
*H02G 1/02* (2006.01)

(52) U.S. Cl.
CPC .................. *H02G 7/14* (2013.01); *H02G 1/02* (2013.01)

(58) Field of Classification Search
USPC ......................................................... 174/42
See application file for complete search history.

(56) References Cited

U.S. PATENT DOCUMENTS

| 3,052,747 A | 9/1962 | Clark et al. | |
| 4,011,397 A | 3/1977 | Bouche | |
| 4,714,799 A * | 12/1987 | Hawkins | H02G 7/14 174/42 |
| 6,943,290 B2 * | 9/2005 | Dulhunty | H02G 7/14 174/130 |
| 2004/0035601 A1 | 2/2004 | Dulhunty | |
| 2013/0061466 A1 * | 3/2013 | Casenhiser | H02G 7/14 29/825 |

OTHER PUBLICATIONS

International Search Report for PCT/US2014/047816 dated Oct. 27, 2014.
Written Opinion for PCT/US2014/047816 dated Oct. 27, 2014.

* cited by examiner

Primary Examiner — Dhirubhai R Patel
(74) Attorney, Agent, or Firm — Dority & Manning, P.A.

(57) ABSTRACT

An asymmetric Stockbridge damper including a clamp and two weights of unequal mass connected to the damper. The damper may further include one or two messenger strands connecting the weights to the clamp. The weights may be situated so that they are an unequal distance from the clamp. The damper may further include a base connected to the clamp, and the weights may be connected to the base. The weights may be bell-shaped. The weights may have smooth contours. The clamp may use a breakaway bolt. The clamp may be designed for high temperature conductor applications. The messenger strands may be made of a 19-strand cable. The messenger strands may be attached to end of the weights and flushed to those ends.

16 Claims, 3 Drawing Sheets

ASYMMETRICAL STOCKBRIDGE DAMPER

CROSS-REFERENCE TO RELATED APPLICATIONS

This application is a National Stage Application of International Application No. PCT/US2014/047816 filed Jul. 23, 2014 claiming priority based on U.S. Provisional Application No. 61/857,811, filed Jul. 24, 2013, in the United States Patent and Trademark Office, the disclosure of which is incorporated herein in its entirety by reference.

BACKGROUND

1. Field

The invention is related to dampers, and more particularly to Stockbridge dampers.

2. Related Art

One of the key challenges in the use of Stockbridge dampers is the significant size and weight of the dampers. Therefore, such dampers are cumbersome and have high manufacturing costs. Further, Stockbridge dampers use two of the same damper weights, producing a damper capable of only two natural frequency modes.

Designing a Stockbridge damper which requires less material would reduce the cost and weight of the dampers. Further, designing a Stockbridge damper which has more than two natural frequency modes would increase the efficiency of the damper. The current exemplary embodiments provide a means for reducing the weight and material costs, and increasing the efficiency of the damper.

SUMMARY

Exemplary implementations of the present invention address the problems and/or disadvantages of the current technology/methodology described above. Although the present invention is not required to overcome all of the disadvantages described above, an exemplary implementation of the present invention may address the above disadvantages, and further disadvantages not described above, or may not overcome any of the problems listed above while still providing improved methodology and enhancement to the present art.

One embodiment of the present invention utilizes two different weights in its design. The weights may be utilized such that their damping contributions are effective at different frequencies from each other. The weights are connected to a clamp.

Other features of the embodiment may include damper weights which are smaller in size and weight than traditional dampers. Other features of the embodiment may include bell-shaped damper weights.

Other features of the embodiment may include one or more messenger strands connecting the weights to the clamp. Other features of the embodiment may include messenger strands of different lengths. Other features of the embodiment may include messenger strands which are 19-strand cables.

Other features of the embodiment may include a conductor clamp to be used with high temperature conductor applications, up to 250 degrees Celsius. Other features of the embodiment may include the clamp utilizing a breakaway bolt.

According to one or more exemplary embodiment, there is provided an asymmetric Stockbridge damper including: a clamp; a first weight connected to the clamp; and a second weight connected to the clamp. The first weight and the second weight may each have a respective mass and a respective dimension, and the mass of the first weight may differ from the mass of the second weight.

The dimension of the first weight may differ from the dimension of the second weight.

At least one of the first weight dimension and the second weight dimension may be bell-shaped.

The clamp may be configured to be used in high temperature conductor applications.

The clamp may include a breakaway bolt.

The clamp may include a water drain groove.

The first weight and the second weight may each further include a respective drain hole.

At least one of the first weight and the second weight may include a respective outer surface, and the respective outer surfaces have a smooth contour.

The asymmetric Stockbridge damper may further include a base connected to the clamp. The first weight and the second weight may be connected to the base.

The asymmetric Stockbridge damper may further include a messenger strand. The messenger strand may include a first end, a second end, and a central portion, and the central portion of the messenger strand may be connected to the clamp, the first end of the messenger strand is connected to the first weight, and the second end of the messenger strand is connected to the second weight.

The messenger strand may have a first length from the central portion to the first end and a second length from the central portion to the second end, and the first length may differ from the second length.

The messenger strand may be made of a 19-strand steel cable.

The first end of the messenger strand may be flushed with the first weight, and the second end of the messenger strand may be flushed with the second weight.

The asymmetric Stockbridge damper may further include a base connected to the clamp, and the central portion of the messenger strand is connected to the base.

The asymmetric Stockbridge damper may further include: a first messenger strand with a first end connected to the clamp and a second end connected to the first weight; and a second messenger strand with a first end connected to the clamp and a second end connected to the second weight.

The first messenger strand may have a length between the first end and the second end, and the second messenger strand may have a length between the first end and the second end, and the length of the first messenger strand may differ from the length of the second messenger strand.

The first messenger strand and the second messenger strand each be made from a 19-strand steel cable.

The second end of the first messenger strand may be flushed with the first weight, and the second end of the second messenger strand may be flushed with the second weight.

The asymmetric Stockbridge damper may further include a base connected to the clamp. The first end of the first messenger strand and the first end of the second messenger strand may be connected to the base.

DETAILED DESCRIPTION

The following detailed description is provided to assist the reader in gaining a comprehensive understanding of the methods, apparatuses and/or systems described herein. Various changes, modifications, and equivalents of the systems, apparatuses and/or methods described herein will suggest themselves to those of ordinary skill in the art. Descriptions of well-known functions and structures are omitted to enhance clarity and conciseness.

Figure 1:
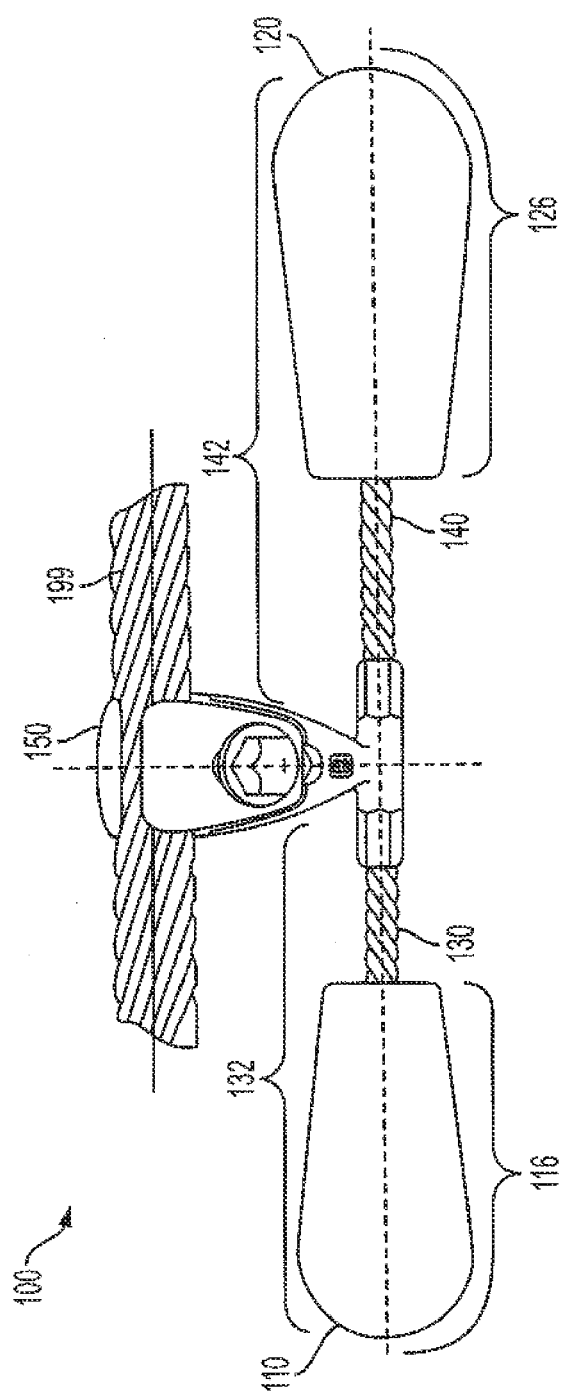
FIG. 1 shows a perspective view of an exemplary embodiment of an asymmetrical Stockbridge damper.

FIG. 1 shows a perspective view of an exemplary embodiment of an asymmetrical Stockbridge dampener 100. The asymmetrical Stockbridge dampener 100 includes a clamp 150, a first weight 110, a second weight 120, and a messenger strand including a first messenger strand portion 130 and a second messenger strand portion 140. The messenger strand connects the first weight 110 and the second weight 120 to the clamp 150. The first messenger strand portion 130 extends from the first weight 110 to the clamp 150. The second messenger strand portion 140 extends from the second weight 120 to the clamp 150. As shown, the clamp 150 clamps a cable 199. Weights 110 and 120 each have a smooth contour, 116 and 126 respectively. The smooth contours may limit the corona effect. The first messenger strand portion 130 has a length 132 that may be different from the length 142 of the second messenger strand portion 140. The weights 110 and 120 each have a mass. The first weight 110 mass differs from the mass of the second weight 120. The masses of the weights 110 and 120 and the lengths 132 and 142 of the messenger strand portions 130 and 140 may be set such that damper 100 is efficient over a range of the aeolian frequency span. The lengths 132 and 142 of messenger strand portions 130 and 140 may be tuned to the mass of the respective weight 110 and 120.

The weights 110 and 120 may be in a bell-shape as shown. Alternatively, the weights 110 and 120 may be in a different shape, for example spherical or cuboid (not shown).

The messenger strand may be made of a 19-strand cable. The lengths 132 and 142 of the messenger strand portions 130 and 140 may be inversely proportional to the mass of the respective weights 110 and 120. In an exemplary embodiment, the ratio of the length 132 of the first messenger strand portion 130 to the length 142 of the second messenger strand portion 140 may be about 7 to 8. For instance, the length 132 of the first messenger strand portion 130 may be about 7 inches and the length 142 of the second messenger strand portion 140 may be about 8 inches. Although the current exemplary embodiment uses a single messenger strand including a first messenger strand portion 130 and a second messenger strand portion 140, other embodiments may use a two separate messenger strands (not shown) to connect the weights 110 and 120 to the clamp 150. In this case, a first messenger strand may connect the first weight 110 to the clamp 150, and a second messenger strand may connect the second weight 120 to the clamp 150. The first and second messenger strands may have lengths corresponding to the respective lengths 132 and 142 of the messenger strand portions 130 and 140.

Figure 2:
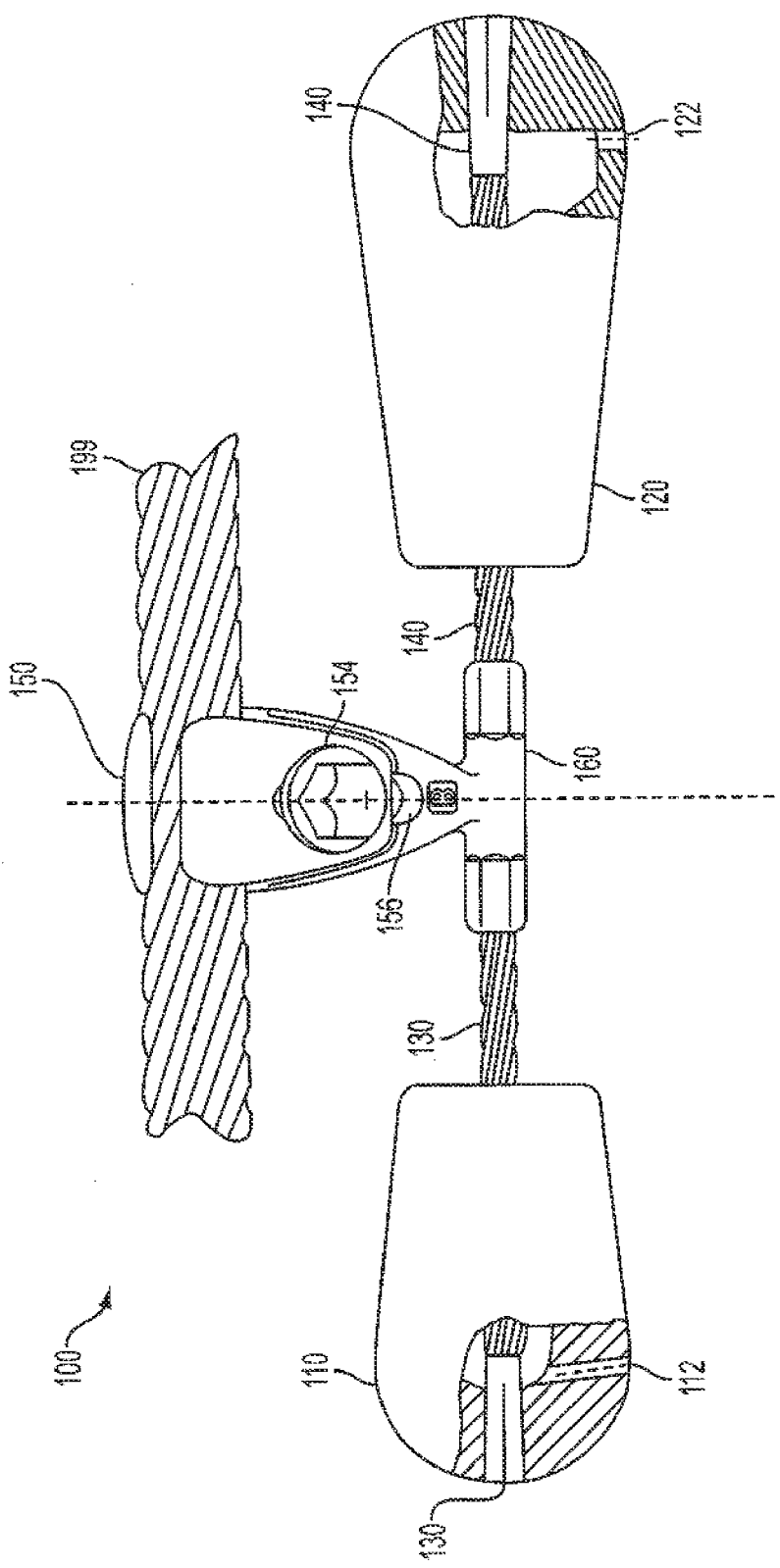
FIG. 2 shows a perspective view of another exemplary embodiment of an asymmetrical Stockbridge damper.

FIG. 2 shows a perspective view of an exemplary embodiment of an asymmetrical Stockbridge dampener 100 with additional features. The asymmetrical Stockbridge dampener 100 includes a clamp 150, a first weight 110, a second weight 120, a messenger strand including a first messenger strand portion 130 and a second messenger strand portion 140, and a base 160. The clamp 150 is engaged with a cable 199. The base 160 is connected to the clamp 150. The messenger strand connects the first weight 110 and the second weight 120 to the base 160. The first messenger strand portion 130 extends from the first weight 110 to the base 160. The second messenger strand portion 140 extends from the second weight 120 to the base 160 of the clamp 150. The clamp 150 has a bolt 154 and a water drain groove 156 as shown. The bolt 154 may be a breakaway bolt to ensure consistent torque requirements. Weights 110 and 120 each have a drain hole, 112 and 122 respectively. The drain holes 112 and 122 are positioned so they face generally downward while the clamp 100 engages a cable 199. The first messenger strand portion 130 is flushed with the end of the first weight 110, and the second messenger strand portion 140 is flushed with the end of the second weight 120.

The weights 110 and 120 each have a mass. The first weight 110 has a dimension that may differ from the dimension of the second weight 120, wherein the dimension of the first weight is its shape and size and the dimension of the second weight is its shape and size. The mass of the first weight 100 differs from the mass of the second weight 120. The first messenger strand portion 130 has a length that may be different from the length of the second messenger strand portion 140. The masses of the weights 110 and 120 and the lengths of the messenger strand portions 130 and 140 may be set such that damper is efficient over a range of the aeolian frequency span. The weights 110 and 120 may be in a bell-shape as shown. Alternatively, the weights 110 and 120 may be another shape, such as a sphere or cuboid (not shown). The messenger strand may be a 19-strand cable. The clamp 150 may be designed to be used in high temperature conductor applications.

Figure 3:
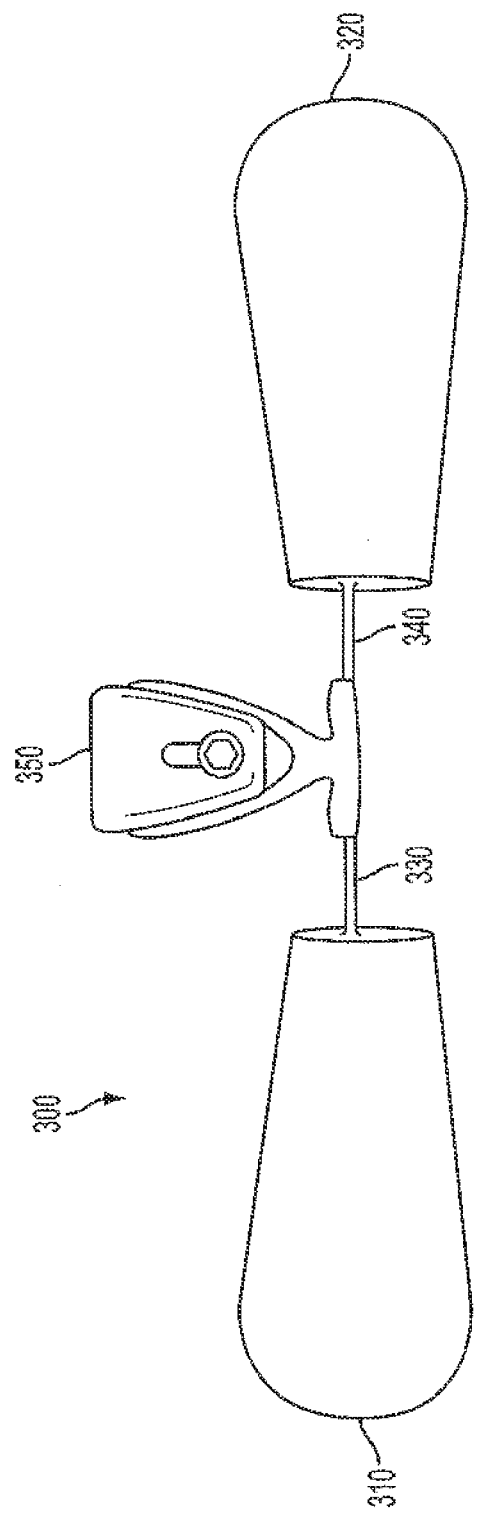
FIG. 3 shows a perspective view of a conventional Stockbridge dampener.

FIG. 3 shows perspective view of a conventional Stockbridge dampener 300. The conventional Stockbridge dampener 300 includes a clamp 350, a first weight 310, a second weight 320, and a messenger strand including a first messenger strand portion 330 and a second messenger strand portion 340. The first weight 310 and the second weight 320 have the same mass and dimension. The first messenger strand portion 330 and the second messenger strand portion 340 have the same length. The conventional damper only has two natural frequency response modes.

Advantages and benefits of the invention may include, but are not limited to, the following:

1. New design provides more efficient dampening.
2. New design provides four natural frequency response modes.
3. Asymmetric weights provide wider frequency response range.
4. Asymmetric-weight design provides similar or greater dampening effect as compared to more massive symmetric-weight design.
5. New design provides reduced manufacturing and shipping costs.
6. New design provides easier to install damper.
7. Optional breakaway bolts ensure consistent torque requirements.
8. Nineteen-strand messenger strand provides highly efficient energy dissipation.
9. Bell-shaped weight and smooth contours throughout the entire design provide good corona performance.

What is claimed is:

1. An asymmetric Stockbridge damper comprising:
   a clamp;
   a first weight connected to the clamp;
   a second weight connected to the clamp; and a messenger strand connecting the clamp and the first weight and connecting the clamp and the second weight, wherein a maximum length of the messenger strand from the clamp to a first distal end of the messenger strand connected to the first weight is different from a maximum length of the messenger strand from the clamp to a second distal end of the messenger strand connected to the second weight;

a base connected to the clamp, wherein the first weight and the second weight are connected to the base via the messenger strand, wherein the first weight and the second weight each comprise a respective mass and a respective dimension, wherein the mass of the first weight differs from the mass of the second weight, wherein the clamp further comprises a water drain groove, and wherein the first weight and the second weight each comprise a drain hole.

2. The asymmetric Stockbridge damper from claim 1 wherein the dimension of the first weight differs from the dimension of the second weight.

3. The asymmetric Stockbridge damper from claim 1 wherein at least one of the first weight dimension and the second weight dimension is bell-shaped.

4. The asymmetric Stockbridge damper from claim 1 wherein the clamp is configured to be used in high temperature conductor applications.

5. The asymmetric Stockbridge damper from claim 1 wherein the clamp further comprises a breakaway bolt.

6. The asymmetric Stockbridge damper from claim 1 wherein at least one of the first weight and the second weight further comprise respective outer surfaces, wherein the respective outer surfaces comprise smooth contour.

7. The asymmetric Stockbridge damper from claim 1, wherein the messenger strand comprises the first distal end, the second distal end, and a central portion, wherein the central portion of the messenger strand is connected to the clamp, and wherein the first distal end of the messenger strand is connected to the first weight, and wherein the second distal end of the messenger strand is connected to the second weight.

8. The asymmetric Stockbridge damper from claim 7 wherein the central portion of the messenger strand is connected to the base.

9. The asymmetric Stockbridge damper from claim 1, wherein the messenger strand comprises:
a first messenger strand comprising the first distal end and a second proximal end, wherein the first distal end is connected to the first weight and the second proximal end is connected to the clamp; and
a second messenger strand comprising a first proximal end and the second distal end, wherein the first proximal end is connected to the clamp and the second distal end is connected to the second weight.

10. The asymmetric Stockbridge damper from claim 9 wherein the second proximal end of the first messenger strand and the first proximal end of the second messenger strand are connected to the base.

11. The asymmetric Stockbridge damper from claim 1 wherein the messenger strand comprises a 19-strand steel cable.

12. The asymmetric Stockbridge damper from claim 1 wherein the first distal end of the messenger strand is flushed with the first weight, and wherein the second distal end of the messenger strand is flushed with the second weight.

13. An asymmetric Stockbridge damper comprising:
a clamp;
a first weight connected to the clamp;
a second weight connected to the clamp;
a messenger strand connecting the clamp and the first weight and connecting the clamp and the second weight; and
a base connected to the clamp, wherein the first weight and the second weight are connected to the base via the messenger strand,
wherein the first weight and the second weight each comprise a respective mass and the mass of the first weight differs from the mass of the second weight,
wherein a length between the clamp and a distal end of the first weight is different from a length between the clamp and a distal end of the second weight,
wherein the clamp further comprises a water drain groove, and
wherein the first weight and the second weight each comprise a drain hole.

14. The asymmetric Stockbridge damper of claim 13, wherein the first weight and the second weight each comprise a respective dimension, and wherein the dimension of the first weight differs from the dimension of the second weight.

15. The asymmetric Stockbridge damper of claim 13, wherein at least one of the first weight dimension and the second weight dimension is bell-shaped.

16. An asymmetric Stockbridge damper comprising:
a clamp;
a first weight connected to the clamp;
a second weight connected to the clamp;
a messenger strand connecting the clamp and the first weight and connecting the clamp and the second weight; and
a base connected to the clamp, wherein the first weight and the second weight are connected to the base via the messenger strand,
wherein a length between the clamp and a distal end of the first weight is different from a length between the clamp and a distal end of the second weight,
wherein the clamp further comprises a water drain groove, and
wherein the first weight and the second weight each comprise a drain hole.

\* \* \* \* \*